SUBSCRIPTION TELEVISION RECEIVER TRANSLATING CHANNEL

Filed May 25, 1955

2 Sheets-Sheet 1

WALTER S. DRUZ
*INVENTOR.*

BY Francis W. Crotty

HIS ATTORNEY.

SUBSCRIPTION TELEVISION RECEIVER TRANSLATING CHANNEL

Filed May 25, 1955 2 Sheets-Sheet 2

WALTER S. DRUZ
*INVENTOR.*
BY Francis W. Crotty
HIS ATTORNEY.

United States Patent Office 2,770,672

Patented Nov. 13, 1956

2,770,672

SUBSCRIPTION TELEVISION RECEIVER TRANSLATING CHANNEL

Walter S. Druz, Bensenville, Ill., assignor to Zenith Radio Corporation, a corporation of Illinois Application May 25, 1955, Serial No. 510,898

7 Claims. (Cl. 178—5.1)

Figure 1:
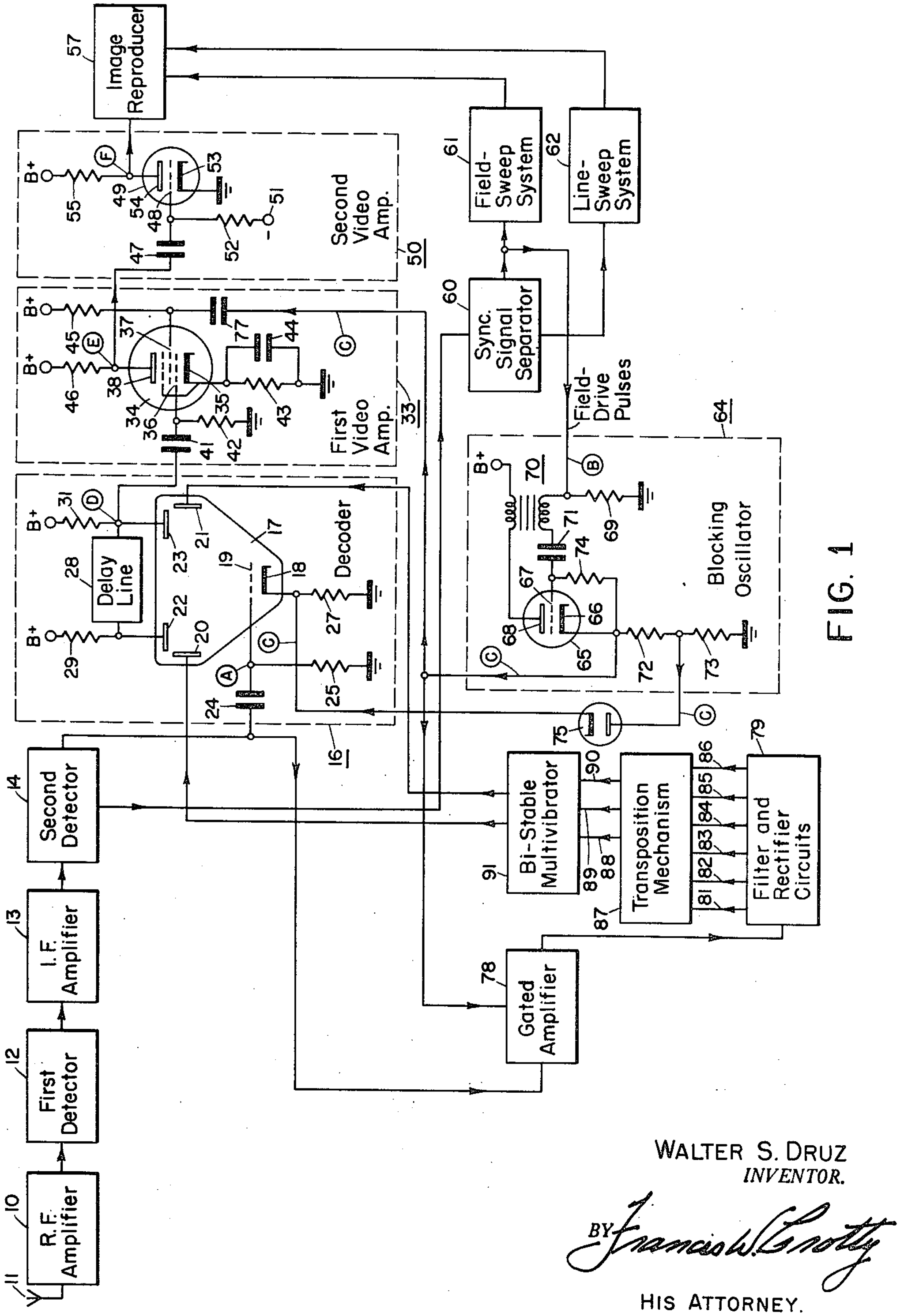

This invention relates in general to a subscription television receiver for utilizing a composite television signal, coded in accordance with a predetermined code schedule, and including during field-retrace intervals code signal components representing the code schedule. More particularly, the invention pertains to a novel video signal translating channel for use in such a receiver for removing the code signal components from the composite television signal and establishing in place thereof retrace-blanking pulses to block out the image tube during retrace intervals.

In numerous subscription television systems the television signal is coded in accordance with a selected code schedule at the transmitter, and a coding signal representing or indicative of the code schedule is transmitted to subscriber receivers as a modulation of the television signal itself. For example, in copending application Serial No. 326,107, filed December 15, 1952, in the name of Jack E. Bridges, and assigned to the present assignee, there is disclosed a system wherein the coding signal comprises combinations of signal bursts, individually having a predetermined frequency, transmitted to subscriber receivers during field-retrace intervals along with the video signal. The code signal components are preferably a downward or inward modulation of the field-blanking pedestal and occupy substantially the same amplitude range of the carrier as the video components. This minimizes interference with the receiver sweep circuits which could easily arise if the code bursts extended into the amplitude range reserved for the synchronizing pulses.

The signal bursts are preferably randomly sequenced and randomly appearing within each combination and are derived from the video signal at the receiver by means of filters and rectifiers. They are segregated from one another for application over assigned input circuits to a transportation or switching mechanism. That mechanism is arranged to selectively establish circuit connections between these input circuits and a plurality of output circuits leading to a multi-stable actuating device, such as a bi-stable multivibrator. A similar arrangement is employed in the coding apparatus at the transmitter.

At both the transmitter and receiver locations, the code signal bursts applied to the bi-stable multivibrator effect operation from one to the other of its stable operating conditions to impose a change in mode with each shift in operating condition. Mode changes constitute variations in the relative timing of the video and synchronizing components of the television signal.

Since the code signal components are in the same amplitude range as the video, it is important to provide effective retrace blanking of the picture tube to prevent energization of the electron beam in response to code signal bursts. This may be accomplished with a "heavy duty," relatively expensive pulse generator applying blanking pulses to the input electrodes of the picture tube with sufficient amplitude to assure retrace block out. However, in the interests of economy, it is more desirable to utilize an inexpensive pulse generator of limited current-carrying capacity to achieve the same results. The present arrangement achieves retrace blanking with inexpensive circuitry.

It is, accordingly, an object of the present invention to provide a relatively inexpensive retrace-blanking arrangement for a subscription television receiver.

It is another object of the invention to provide a novel subscription television translating channel for eliminating code signal components occurring during retrace intervals and occupying the amplitude region assigned to video.

A channel, constructed in accordance with the invention, for translating a composite television signal which, in addition to the usual video and synchronizing components, includes code signal components which occur during retrace intervals and within an amplitude range otherwise assigned to the video components and therefore subject to impairing retrace blanking, comprises first, second and third video signal translating stages coupled in cascade. Means is provided for applying the composite television signal, with the synchronizing components negative with respect to the video components, to the first stage. A source develops a potential during at least that portion of the retrace intervals in which the code signal components occur and means is provided for impressing a potential from that source on the first stage with a polarity tending to render the first stage non-conductive and of such magnitude that any of the code signal components remaining in the television signal as applied to the second stage are predominately positive with respect to the video components. The channel has means for impressing a potential from the source on the second stage with a polarity tending to increase the gain of the second stage and of such magnitude that the residuum of the code signal components in the television signal as applied to the third stage are negative with respect to the peak amplitude level of the synchronizing components in the output signal of the second stage prior to the application of the potential thereto. Finally, the channel comprises biasing means for the third stage for establishing a cut off condition in response to signal levels negative with respect to approximately the peak synchronizing level, thereby to remove the code signal components from the composite television signal and establish in place thereof retrace blanking pulses.

Figure 2:
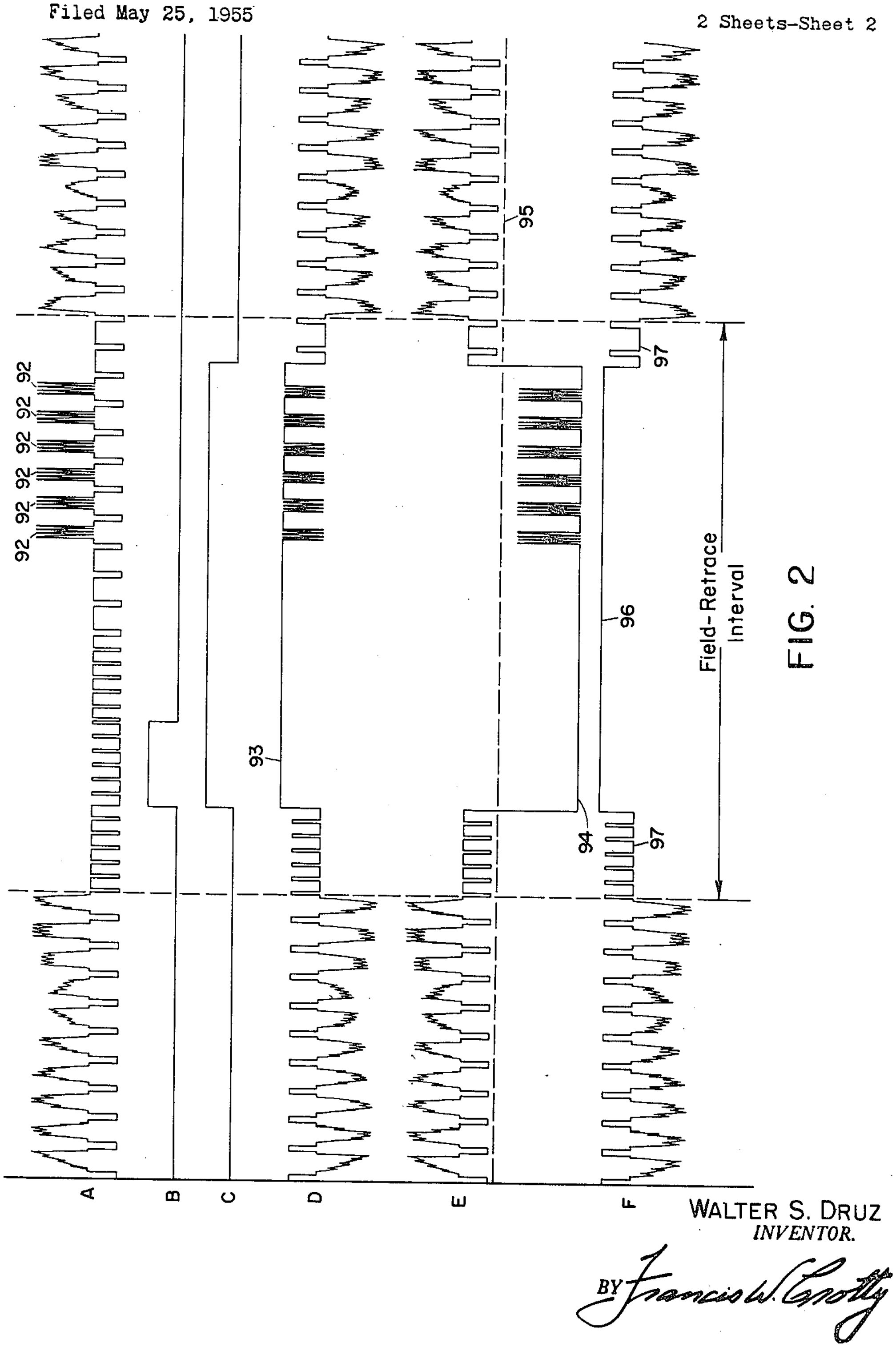

The features of this invention which are believed to be new are set forth with particularity in the appended claims. The invention itself, together with further objects and advantages thereof, may best be understood, however, by reference to the following description when taken in conjunction with the accompanying drawings, in which:

Figure 1 is a schematic diagram of a subscription television receiver including a video signal translating channel constructed in accordance with the invention; and, Figure 2 is a family of wave forms useful in explaining the operation of the receiver.

The receiver, which may utilize a telecast originating at a transmitter constructed in accordance with the aforementioned disclosure by Bridges, comprises a radio-frequency amplifier 10 having input terminals connected to an antenna circuit 11 and output terminals connected to a first detector 12. This detector is coupled through an intermediate-frequency amplifier 13 to a second detector 14 which, in turn, is connected to the input circuit of a decoder 16.

Decoder 16 may be similar to that disclosed and claimed in copending application Serial No. 243,039, filed August 22, 1951, in the name of Robert Adler, and assigned to the present assignee. It may comprise a beam-deflection tube 17 which has a cathode 18, an intensity-control grid 19, a pair of deflection-control electrodes 20, 21, and a pair of output anodes or target electrodes 22, 23. Control grid 19 is coupled to the output circuit of second detector 14 through a coupling condenser 24 and is returned to ground through a grid-leak resistor 25. Cathode 18 is connected to ground through a cathode resistor 27. One of the target electrodes 22 is coupled to the input terminal of a non-reflecting delay line 28 and also to the positive terminal of a source of unidirectional potential B+ through a load resistor 29, while the target electrode 23 is coupled to the output terminal of delay line 28, to the positive terminal of the source of unidirectional potential B+ through a load resistor 31, and to the input circuit of a first video amplifier 33.

The video signal developed at the output terminals of second detector 14 is applied to control grid 19 and intensity modulates the electron beam developed in tube 17. During intervals when the beam is directed to target 22, the video signal is impressed on the input circuit of first video amplifier 33 from a path including delay line 28 and is consequently delayed due to the inclusion of this delay line. However, when the beam is directed to target electrode 23, the video signal is amplified directly to first video amplifier 33 with no appreciable delay. The electron beam is deflected between anodes 22 and 23 in synchronism with mode changes of the transmitted signal by means of a beam-deflection control or actuating signal applied to deflection elements 20, 21 as explained hereinafter. Since delay line 28 is alternately included in and excluded from the video translating channel, the variations in the timing of the video signal relative to the synchronizing signal of the received composite television signal may be compensated effectively to decode the television signal as the beam of the deflection tube is switched between its anodes.

First video amplifier 33 includes an electron-discharge device 34 in the form of a conventional pentode which has a cathode 35, a control grid 36, a screen grid 37 and an anode 38. Control grid 36 is coupled to target anode 23 of beam-deflection tube 17 through a coupling condenser 41 to receive the composite television signal, and is also connected to ground through a grid-leak resistor 42. Cathode 35 is connected to ground through a cathode resistor 43 by-passed by a condenser 44. Screen grid 37 is connected to the source of positive unidirectional potential B+ through a voltage dropping resistor 45. Anode 38 is connected to the source of positive potential B+ through a load resistor 46, and is also coupled through a coupling condenser 47 to the control grid 48 of an electron-discharge device 49 included in a second video amplifier 50. Control grid 48 is also connected to a source of negative bias potential 51 through a grid-leak resistor 52. Cathode 53 of triode 49 is connected to ground and its anode 54 is coupled to the source of positive unidirectional potential B+ through a load resistor 55. Anode 54 is also connected to the input electrodes of a cathode-ray image-reproducing device or picture tube 57.

Second detector 14 is coupled to a synchronizing-signal separator 60 which is coupled, in turn, to a field-sweep system 61 and to a line-sweep system 62. The output terminals of sweep systems 61 and 62 are connected respectively to field- and line-deflection elements (not shown) associated with image-reproducer 57.

In an illustrated embodiment of the Bridges system, the code signal components may comprise six bursts of various signal frequencies individually transmitted between the line-drive pulses on the vertical blanking pulses, after the post-equalizing pulses. To facilitate the separation of these signal bursts from the video signal, and as a first step to retrace block out, pulses are developed in time coincidence with that portion of the composite television signal which contains the bursts. To that end, field-drive pulses are derived from synchronizing-signal separator 60 and supplied to a conventional blocking oscillator 64. The oscillator includes an electron-discharge device 65 having a cathode 66, a control grid 67 and an anode 68. The field-drive pulses are applied to control grid 67 over a shunt-connected resistor 69 and a series circuit including the secondary winding of a transformer 70 and a condenser 71. Anode 68 is coupled through the primary winding of transformer 70 to the source of unidirectional potential B+. Cathode 66 is connected to ground through series-connected resistors 72 and 73 and is connected to control grid 67 via a resistor 74. The junction of resistors 72 and 73 is connected to cathode 18 of beam-deflection tube 17 through an isolating or buffer non-linear device such as a diode 75 in order to impress pulses thereon with positive polarity during the portion of each field-retrace interval containing the code signal bursts; this tends to render decoder or translating stage 16 non-conductive during the occurrence of pulses from oscillator 64. Cathode 66 is connected to screen grid 37 of pentode 34 included in video translating stage 33 through a condenser 77 to impress positive pulses which tend to increase the gain of stage 33 during field-retrace intervals.

Cathode 66 is additionally connected to one input circuit of a normally-closed gated amplifier 78 which has another input circuit coupled to second detector 14 to receive the composite television signal. The output circuit of gate 78 is coupled to each one of a series of filter and rectifier circuits, schematically shown as one unit 79. Since the aforementioned Bridges application discloses a system wherein the coding components developed during each field-retrace interval include signal bursts of six possible frequencies, unit 79 comprises six tuned filter and rectifier circuits.

The output circuit of each of the filter-rectifier networks is connected over a responsive one of a series of conductors 81—86 to a transposition or switching mechanism 87. As far as the technique of coding is concerned, the transposition mechanism is provided merely for the purpose of selectively connecting any one of the conductors 81—86 to any one of three output conductors 88, 89, 90. If the various interconnections established by switching mechanism 87 are identical to the interconnections established by a similar switching mechanism in the coding apparatus at the transmitter, decoding may be effected. The necessary information for setting the transposition mechanism is disseminated only to authorized subscribers and a suitable charge may, of course, be assessed for such information.

Output conductors 88—90 are connected respectively to different input circuits of a bi-stable multivibrator 91 which comprises two cross-coupled triodes. One preferred arrangement connects one of conductors 88—90 to the control grid of one of the triodes so that multivibrator 91 will be actuated to one of its two operating conditions in response to pulses applied thereto over that conductor, to connect another of the conductors to the control grid of the other triode to actuate multivibrator 91 to the other of its operating conditions in response to pulses applied over that conductor, and to connect the third one of conductors 88—90 to the control grid of each triode so that the multivibrator is actuated from its instantaneous condition to its alternate condition in response to pulses received over that third conductor. The output terminals of bi-stable multivibrator 91 are connected to the deflection-control electrodes 20, 21 of decoder 16 to deliver an actuating or deflection-control signal thereto having an amplitude excursion each time the multivibrator changes from one operating condition to the next.

Inasmuch as a complete description of the coding technique is included in the copending Bridges' application and since the coding technique itself forms no part of the present invention, the operation of the complete receiver will be described only briefly, disregarding for the moment certain details of the operation of the video signal translating channel. The coded television signal is intercepted by antenna 11, amplified in radio-frequency amplifier 10, heterodyned to the selected intermediate frequency in first detector 12, amplified in intermediate-frequency amplifier 13 and detected in second detector 14 to produce a detected, coded composite television signal. This signal is translated through decoder 16, amplified in first video amplifier 33 and in second video amplifier 50 and applied to the input electrodes of image-reproducing device 57 to control the intensity of the electron beam of the device in well-known manner.

The synchronizing components of the received signal are separated in separator 60, the field-synchronizing pulses being utilized to synchronize the operation of sweep system 61 and consequently the vertical deflection signal supplied to the field-deflection elements of reproducer 57, whereas the line-synchronizing pulses are utilized to synchronize sweep system 62 and therefore the horizontal deflection signal supplied to the horizontal deflection elements in the image reproducer. Of course, the sound modulated carrier wave normally received along with the video carrier is detected and reproduced in an appropriate audio system which has been omitted from the drawing for the purpose of simplicity.

Field-drive pulses from separator 60 are supplied to blocking oscillator 64 to produce a gating pulse at cathode 66 for application to normally-closed gated amplifier 78. The parameters of the oscillator are so chosen as to overlap, in point of time, that portion of the field-retrace interval of the composite television signal which includes the code signal components. The composite television signal from second detector 14 is continuously applied to amplifier 78, but only the information contained during the interval of the gating pulse from oscillator 64 is translated to filter and rectifier unit 79. Amplifier 78 is thus "open" during the times the code signal components of various frequencies are received and since the filter and rectifier circuits are individually tuned to an assigned one of these frequencies, the signal bursts are separated out from the composite television signal and from each other. Each time a burst of signal frequency occurs, it is channeled over a corresponding input circuit 81—86 through transposition mechanism 87 to a selected one of the input circuits 88—90 of bi-stable multivibrator 91. The coding apparatus at the transmitter preferably is identical to the decoding apparatus at the receiver so if the transposition mechanism is adjusted to the same setting as the transposition mechanism at the transmitter, the input circuits of bi-stable actuating device 91 receive pulses similar to those received by the bi-stable actuating device at the transmitter. Multivibrator 91 produces a rectangularly shaped actuating or deflection-control signal for application to deflection-control elements 20, 21 of decoder 16. It is identical in wave form but opposite in phase to the corresponding deflection-control signal used at the transmitter for coding the television signal. Decoder 16 operates in time synchronism with the coder at the transmitter so that the signal applied to the input circuit of picture tube 57 is suitably compensated or decoded to effect intelligible image reproduction.

In order to simplify a detailed explanation of the operation of the invention, idealized signal wave forms appearing at various portions of the receiver indicated by encircled reference letters are identified by corresponding letter designations in the representations of Figure 2. The composite television signal from detector 14 impressed on control grid 19 of beam-deflection tube 17 is shown in curve A with the synchronizing components negative with respect to the video components. This composite television signal is generally conventional but code signal components or bursts 92 occur between the line-synchronizing components superimposed on the vertical blanking pedestal subsequent to the post equalizing pulses. Of course, the time relationship between the video- and line-synchronizing components is varied to produce a coded picture signal but this has not been shown because of the time scale employed and also because it forms no part of the instant invention. Code signal components 92 have substantially the same peak-to-peak amplitude as the video components and, if they are not removed, will produce retrace scanning lines visible on the picture screen.

Field-drive pulses shown in curve B are derived from separator 60 and applied to blocking oscillator 64 to synchronize the operation thereof at the field rate. The pulse developed in the cathode circuit of oscillator 64 commences with the beginning of the field-drive pulse of curve B but does not terminate until after that portion of the field-retrace interval devoted to the transmission of code signal components 92. Such a pulse is shown in curve C and is applied through diode 75 to cathode 18 of beam-deflection tube 17. This pulse is of positive polarity and thus tends to cut tube 17 off. However, since the triode 65 used in oscillator 64 is limited in current-carrying capacity, the pulse is not sufficient to render tube 17 non-conductive. Consequently, the code signal components appear in the output circuit of decoder 16, as shown in curve D. However, with the cathode pulsed, the tube shifts its operating point and the composite television signal has a pulse component 93. It is positive with respect to the peaks of the synchronizing components. The code signal components 92, appearing in the output because of the inability of the cathode pulse to cut tube 17 off entirely, are now predominately positive with respect to the video components.

The composite television signal of curve D is impressed on control grid 36 of tube 34 and a pulse derived across resistors 72 and 73 in the cathode of blocking oscillator 64 is impressed on its screen 37. The positive pulse impressed on screen 37 increases the transconductance of tube 34 and the gain of the stage. The output signal developed at anode 38 is shown in curve E; it has a pulse component 94 negative with respect to the synchronizing components. Moreover, the code signal components which are subject to the increased gain of tube 34 during the occurrence of the positive polarity screen pulse now become negative with respect to the peak amplitude level of the synchronizing components in the output signal (curve E) of video amplifier 33.

The potential developed across resistor 73 in oscillator 64 is, of course, smaller than that developed at cathode 66. The pulse supplied to cathode 18 of the deflection tube is not derived from cathode 66 because cathode resistor 27 which has a low value would partially short out the screen grid circuit of tube 34. In any event were the larger pulse from cathode 66 impressed on cathode 18, it would not be sufficient to cut tube 17 off completely during the reception of the relatively strong signals.

In the absence of diode 75, cathode 18 would be connected to screen grid 37 of amplifier 33 by way of resistor 72. Since the video signal appears at cathode 18 in coded or scrambled form and at control grid 36 of tube 34 in uncoded or decoded form, coupling between these stages would cause undesirable distortion, specifically ghosts, in the coded picture. The isolation diode 75 prevents such coupling.

The composite television signal of curve E is applied to control grid 48 of tube 49 in video amplifier 50 wherein it is amplified and phase inverted to produce the signal of curve F for application to the input electrodes of image reproducer 57. Bias source 51 establishes a cut off condition in tube 49, represented by the construction line 95 in Figure 2. Tube 49 is cut off during the occurrence of the residual code signal components which are thus removed from the composite television signal and replaced with a "clean" retrace blanking pulse 96. Of course, the conventional field-blanking pulse or pedestal remains during the other portions of the field-retrace interval, as indicated by reference numerals 97 and is effective for retrace blanking during the portion of the field-retrace interval not embraced by pulse C.

Actually, second video amplifier 50 is not essential since the signal of curve E may be applied directly to the input electrodes of image reproducer 57. In that case, the image reproducing device would be biased such that none of the code signal components would energize the electron beam. Picture tube 57 would then constitute the third video signal translating stage.

This invention provides, therefore, a video signal translating channel for use in a subscription television receiver which utilizes relatively inexpensive circuitry to remove from the composite television signal code signal components occurring during retrace intervals and having an amplitude within the range assigned to the video components.

While a particular embodiment of the invention has been shown and described, modifications may be made, and it is intended in the appended claims to cover all such modifications as may fall within the true spirit and scope of the invention.

I claim:

1. In a subscription television receiver, a channel for translating a composite television signal which, in addition to the usual video and synchronizing components, includes code signal components which occur during retrace intervals and within an amplitude range otherwise assigned to the video components and therefore subject to impairing retrace blanking in the receiver, said channel comprising: first, second and third video signal translating stages coupled in cascade; means for applying said composite television signal, with the synchronizing components negative with respect to the video components, to said first stage; a source for developing a potential during at least that portion of said retrace intervals in which said code signal components occur; means for impressing a potential from said source on said first stage with a polarity tending to render said first stage non-conductive and of such magnitude that any of said code signal components remaining in said television signal as applied to said second stage are predominately positive with respect to said video components; means for impressing a potential from said source on said second stage with a polarity tending to increase the gain of said second stage and of such magnitude that the residuum of said code signal components in said television signal as applied to said third stage are negative with respect to the peak amplitude level of the synchronizing components in the output signal of said second stage prior to the application of the potential thereto; and biasing means for said third stage for establishing a cut off condition in response to signal levels negative with respect to approximately said peak synchronizing level, thereby to remove said code signal components from said composite television signal and establish in place thereof retrace blanking pulses.

2. In a subscription television receiver, a channel for translating a composite television signal which, in addition to the usual video and synchronizing components, includes code signal components which occur during field-retrace intervals and within an amplitude range otherwise assigned to the video components and therefore subject to impairing retrace blanking in the receiver, said channel comprising: first, second and third video signal translating stages coupled in cascade; means for applying said composite television signal, with the synchronizing components negative with respect to the video components, to said first stage; a source for developing a positive potential during at least that portion of said field-retrace intervals in which said code signal components occur; means for impressing a potential from said source on said first stage with a positive polarity tending to render said first stage non-conductive and of such magnitude that any of said code signal components remaining in said television signal as applied to said second stage are predominately positive with respect to said video components; means for impressing a potential from said source on said second stage with a positive polarity tending to increase the gain of said second stage and of such magnitude that the residuum of said code signal components in said television signal as applied to said third stage are negative with respect to the peak amplitude level of the synchronizing components in the output signal of said second stage prior to the application of the potential thereto; and biasing means for said third stage for establishing a cut off condition in response to signal levels negative with respect to approximately said peak synchronizing level, thereby to remove said code signal components from said composite television signal and establish in place thereof retrace blanking pulses.

3. In a subscription television receiver, a channel for translating a composite television signal which, in addition to the usual video and synchronizing components, includes code signal components which occur during retrace intervals and within an amplitude range otherwise assigned to the video components and therefore subject to impairing retrace blanking in the receiver, said channel comprising: a first video signal translating stage including an electron-discharge device having a cathode and a control grid, a second video signal translating stage including an electron-discharge device having a screen grid, and a third video signal translating stage, all three of said stages coupled in cascade; means for applying said composite television signal, with the synchronizing components negative with respect to the video components, to the control grid of said first stage; a source for developing pulses of two different positive potential levels during at least that portion of said retrace intervals in which said code signal components occur; means for impressing pulses of one of said positive potential levels from said source on the cathode of said first stage tending to render said first stage non-conductive and of such magnitude that any of said code signal components remaining in said television signal as applied to said second stage are predominantly positive with respect to said video components; means for impressing pulses of the other of said positive potential levels from said source on the screen grid of said second stage tending to increase the gain of said second stage and of such magnitude that the residuum of said code signal components in said television signal as applied to said third stage are negative with respect to the peak amplitude level of the synchronizing components in the output signal of said second stage prior to the aplication of the pulses thereto; and biasing means for said third stage for establishing a cutoff condition in response to signal levels negative with respect to approximately said peak synchronizing level, thereby to remove said code signal components from said composite television signal and establish in place thereof retrace blanking pulses.

4. In a subscription television receiver, a channel for translating a composite television signal which, in addition to the usual video, field- and line-synchronizing components, includes code signal components which occur during field-retrace intervals and within an amplitude range otherwise assigned to the video components and therefore subject to impairing retrace blanking in the receiver, said channel comprising: first, second and third video signal translating stages coupled in cascade; means for applying said composite television signal, with the field- and line-synchronizing components negative with respect to the video components, to said first stage; a blocking oscillator synchronized by said field-synchronizing components for developing a potential during at least that portion of said field-retrace intervals in which said code signal components occur; means for impressing a potential from said blocking oscillator on said first stage with a polarity tending to render said first stage non-conductive and of such magnitude that any of said code signal components remaining in said television signal as applied to said second stage are predominately positive with respect to said video components; means for impressing a potential from said blocking oscillator on said second stage with a polarity tending to increase the gain of said second stage and of such magnitude that the residuum of said code signal components in said television signal as applied to said third stage are negative with respect to the peak amplitude level of the synchronizing components in the output signal of said second stage prior to the application of the potential thereto; and biasing means for said third stage for establishing a cut off condition in response to signal levels negative with respect to approximately said peak synchronizing level, thereby to remove said code signal components from said composite television signal and establish in place thereof retrace blanking pulses.

5. In a subscription television receiver, a channel for translating a composite television signal which, in addition to the usual video, field- and line-synchronizing components, includes code signal components which occur during field-retrace intervals and within an amplitude range otherwise assigned to the video components and therefore subject to impairing retrace blanking in the receiver, said channel comprising: first, second and third video signal translating stages coupled in cascade; means for applying said composite television signal, with the field- and line-synchronizing components negative with respect to the video components, to said first stage; a blocking oscillator synchronized by said field-synchronizing components, including an electron-discharge device having a cathode and a resistor coupled to said cathode, for developing a potential during at least that portion of said field-retrace intervals in which said code signal components occur; means, including a non-linear device, coupling a point along said resistor to said first stage to impress a potential thereon with a polarity tending to render said first stage non-conductive and of such magnitude that any of said code signal components remaining in said television signal as applied to said second stage are predominately positive with respect to said video components; means coupling the cathode of said blocking oscillator to said second stage to impress a potential thereon with a polarity tending to increase the gain of said second stage and of such magnitude that the residuum of said code signal components in said television signal as applied to said third stage are negative with respect to the peak amplitude level of the synchronizing components in the output signal of said second stage prior to the application of the potential thereto, said non-linear device preventing cross coupling between said first stage and said second stage; and biasing means for said third stage for establishing a cut off conditon in response to signal levels negative with respect to approximately said peak synchronizing level, thereby to remove said code signal components from said composite television signal and establish in place thereof retrace blanking pulses.

6. In a subscription television receiver, a channel for translating a composite television signal which, in addition to the usual video and synchronizing components, includes code signal components which occur during retrace intervals and within an amplitude range otherwise assigned to the video components and therefore subject to impairing retrace blanking in the receiver, said channel comprising: a video decoder including a beam-deflection tube having a cathode and a control grid; a first video amplifier including an electron-discharge device having a screen grid; a second video amplifier; means coupling said decoder and said first and second video amplifiers in cascade; means for applying said composite television signal, with the synchronizing components negative with respect to the video components, to the control grid of the beam-deflection tube included in said video decoder; a source for developing pulses of two different positive potential levels during at least that portion of said retrace intervals in which said code signal components occur; means for impressing pulses of one of said positive potential levels from said source on the cathode of the beam-deflection tube included in said video decoder tending to render said decoder non-conductive and of such magnitude that any of said code signal components remaining in said television signal as applied to said first video amplifier are predominately positive with respect to said video components; means for impressing pulses of the other of said positive potential levels from said source on the screen grid of the electron-discharge device included in said first video amplifier tending to increase the gain of said first video amplifier and of such magnitude that the residuum of said code signal components in said television signal as applied to said second video amplifier are negative with respect to the peak amplitude level of the synchronizing components in the output signal of said first video amplifier prior to the application of the pulses thereto; and biasing means for said second video amplifier for establishing a cut off condition in response to signal levels negative with respect to approximately said peak synchronizing level, thereby to remove said code signal components from said composite television signal and establish in place thereof retrace blanking pulses.

7. In a subscription television receiver, a channel for translating a composite television signal which, in addition to the usual video, field- and line-synchronizing components, includes code signal components which occur during field-retrace intervals and within an amplitude range otherwise assigned to the video components and therefore subject to impairing retrace blanking in the receiver, said chanel comprising: a video decoder including a beam-deflection tube having a cathode and a control grid; a first video amplifier including an electron-discharge device having a screen grid; a second video amplifier; means coupling said decoder and said first and second video amplifiers in cascade; means for applying said composite television signal, with the synchronizing components negative with respect to the video components, to the control grid of the beam-deflection tube included in said video decoder; a blocking oscillator synchronized by said field-synchronizing components, including an electron-discharge device having a cathode and a resistor coupled thereto, for developing pulses of two different positive potential levels during at least that portion of said field-retrace intervals in which said code signal components occur; means coupling a point along said resistor to the cathode of the beam-deflection tube included in said decoder to impress pulses of one of said positive potential levels from said blocking oscillator thereon tending to render said decoder non-conductive and of such magnitude that any of said code signal components remaining in said television signal as applied to said second stage are predominately positive with respect to said video components; means coupling the cathode of said blocking oscillator to the screen grid of said first video amplifier for impressing pulses of the other of said positive potential levels from said blocking oscillator thereon tending to increase the gain of said first video amplifier and of such magnitude that the residuum of said code signal components in said television signal as applied to said second video amplifier are negative with respect to the peak amplitude level of the synchronizing components in the output signal of said first video amplifier prior to the application of the pulses thereto; and biasing means for said second video amplifier for establishing a cut off condition in response to signal levels negative with respect to approximately said peak synchronizing level, thereby to remove said code signal components from said composite television signal and establish in place thereof retrace blanking pulses.

No references cited.